July 21, 1959 N. W. PARKER 2,896,013
COLOR TELEVISION RECEIVER
Filed Aug. 5, 1953
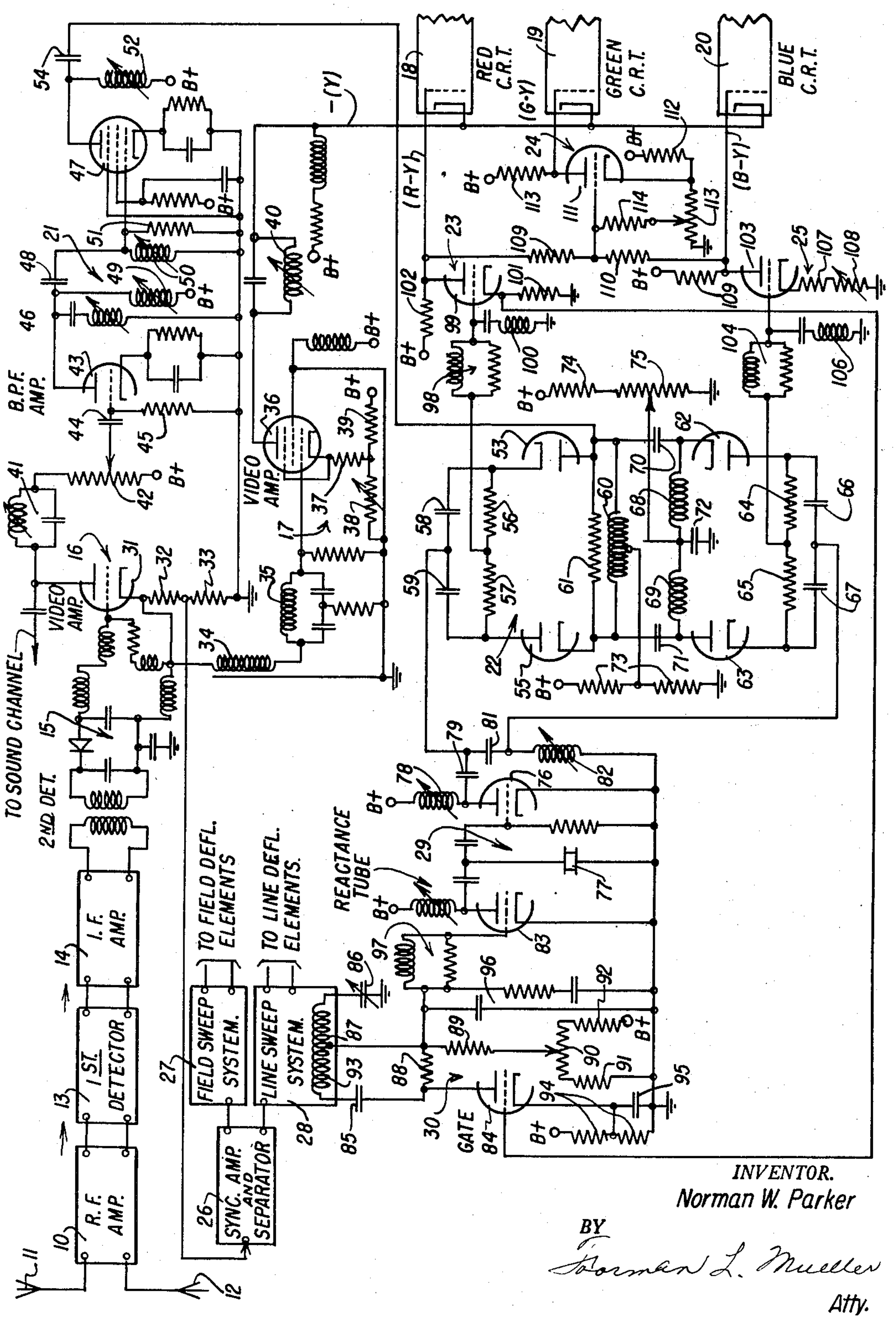
INVENTOR.
Norman W. Parker
BY
Norman L. Mueller
Atty.

United States Patent Office 2,896,013

Patented July 21, 1959

2,896,013

COLOR TELEVISION RECEIVER

Norman W. Parker, Park Forest, Ill., assignor to Motorola, Inc., Chicago, Ill., a corporation of Illinois Application August 5, 1953, Serial No. 372,547

10 Claims. (Cl. 178—5.4)

The present invention relates to color television receivers and more particularly to an improved color television receiver of the type which operates from a signal including a monochrome component and color difference components.

In order to achieve compatibility with existing monochrome television receivers, a color television system designated NTSC has been devised in which separate color video signals are obtained at the transmitter from a suitable picture converting means and which represent various primary color intensities of the scene to be televised. These color video signals are combined in selected proportions to constitute a monochrome video signal which, in turn, is combined with line and field synchronizing components to form a television signal which is modulated on a main carrier wave. The resulting television signal is so constituted that it conforms in all respects with present-day monochrome standards and may be reproduced in black and white in existing monochrome receivers. To enable the televised scene to be reproduced in color in color television receivers, the various color video signals are mixed with the monochrome signal at the transmitter to constitute a series of color difference video signals each bearing distinct chroma information and each being modulated on suitable sub-carrier components which, in turn, are modulated on the main carrier of the television signal.

Full details of a typical NTSC color television system may be found in the February 1952 edition of Electronics Magazine, published by McGraw-Hill Corporation in an article entitled "Principles of NTSC Compatible Color Television" by W. C. Hirsch et al., page 88 of that publication. As mentioned in the article, it is usual in a three-color television system to modulate the color difference signal ($b-y$) corresponding to the difference between the blue video signal and the monochrome video signal on a subcarrier component having a certain phase and frequency. In addition, the color difference signal ($r-y$) corresponding to the difference between the red video signal and the monochrome video signal is modulated on a subcarrier component having the frequency of the first-mentioned sub-carrier, but in phase quadrature therewith. It is only necessary to send the two color-difference signals referred to above, since the green color difference signal ($g-y$) may be reconstituted at the receiver by a comparison of the other two color-difference signals in a suitable matrix, this being a well known expedient referred to in the Hirsch article.

It is usual in NTSC color television systems to include, in the television signal bursts of a reference signal of the same frequency as the color sub-carriers and, in accordance with present practice, in phase with the ($b-y$) color sub-carrier; these bursts being impressed upon successive line blanking pulses in the television signal immediately following the respective line synchronizing pulses pedestaled on the blanking pulses.

It is an object of the present invention to provide an improved color television receiver for operation in an NTSC system such as that described above and which is constructed so that the televised scene may be reproduced in full color by means of relatively simple circuitry and relatively few component parts.

Another object of the invention is to provide an improved color television receiver for reproducing an NTSC color television signal in an improved and greatly simplified manner.

Yet another object of the invention is to provide such an improved and simplified color television receiver which is capable of true-color reproduction and which is not subject to color contamination.

A feature of the present invention is the provision of an improved color television receiver in which the chroma information represented by the color-difference signals is recovered from each of the sub-carrier components by a demodulator which produces the chroma information on an essentially zero D.C. axis. This facilitates the use of a simple direct-current coupled amplifier stage for each of the demodulated color difference signals, and this obviates the need for direct current reinserters which have a tendency to cause color contamination unless additional circuitry and components are provided to prevent such contamination.

Another feature of the invention is the provision of such an improved color television receiver in which the modulated sub-carrier components from the color television receiver are selected and amplified in a bandpass amplifier and supplied thereby to the chroma demodulators. In this manner the color difference signals produced by the demodulators have sufficient intensity so that only a single direct-current coupled amplifier is required for each color difference signal.

Still another feature of the invention is the provision of such an improved color television receiver in which the second detector is coupled to the first video amplifier in a unique manner to enable the first video amplifier to amplify the demodulated color television receiver without phase reversal in so far as the brightness channel of the receiver is concerned, and with phase reversal in so far as the chroma channel is concerned. This expedient allows for the proper polarity of the various signals in the brightness and chroma channels without the need for an additional phase inverting stage in either of these channels.

The above and other features of the invention which are believed to be new are set forth with particularity in the appended claims. The invention itself, however, together with further objects and advantages thereof may best be understood by reference to the following description when taken in conjunction with the accompanying drawing in which:

The single figure shows a preferred embodiment of the invention.

The color television receiver of the present invention utilizes a color television signal which includes at least one sub-carrier component modulated in accordance with chroma information. The receiver comprises a detector for demodulating the color television signal and a color cathode ray image reproducing means. A bandpass amplifier means is coupled to the detector for selecting and amplifying the modulated sub-carrier component, and a chroma demodulator is coupled to the bandpass amplifier for deriving the chroma modulation components of the sub-carrier. Finally, a direct-current coupled amplifier is coupled to the chroma demodulator and to the cathode ray image reproducing means for amplifying the demodulated chroma information and providing a direct current path therefor from the chroma demodulator to the reproducing means.

The color television receiver of the invention includes a radio frequency amplifier 10 having input terminals coupled to a suitable antenna 11, 12 and having output terminals coupled through a first detector 13 to an intermediate frequency amplifier 14. The intermediate frequency amplifier is coupled to a second detector 15 which, in turn, is coupled to a video amplifier indicated generally as 16.

The video amplifier 16 is coupled to the brightness channel of the receiver which includes a second video amplifier indicated generally as 17, the latter being coupled to the cathodes of the color cathode ray image reproducing means 18, 19 and 20. The reproducing means 18, 19 and 20 are shown as three separate devices for purposes of clarity, but it is to be understood that it is common practice to combine the three devices within a single envelope.

Video amplifier 16 is also coupled to the chroma channel of the receiver which includes a bandpass amplifier indicated generally as 21, a pair of chroma demodulators indicated generally as 22, and three direct-current coupled amplifiers indicated generally as 23, 24 and 25; the amplifiers being coupled to the respective control electrodes of reproducing devices 18, 19 and 20.

Video amplifier 16 is also coupled to a synchronizing signal amplifier and separator 26 which in turn is connected to a field sweep system 27 and a line sweep system 28. The sweep systems are connected respectively to the field deflection elements and line deflection elements (not shown) of the cathode ray image reproducing means 18, 19 and 20.

The receiver also includes an oscillator indicated generally as 29 for supplying control signals to the chroma demodulators 22, this oscillator being controlled by the reference bursts of the color television signal through a gate circuit in a manner to be described. As previously noted, the NTSC color television signal includes a brightness signal component modulated on a main carrier, and a pair of chroma sub-carrier components having the same frequency but in phase quadrature also modulated on the main carrier. The chroma sub-carriers are modulated respectively by $(r-y)$ and $(b-y)$ chroma information, and the color television signal and includes bursts of a reference signal having the frequency of the color sub-carriers and in phase with the $(b-y)$ sub-carrier. The reference signal bursts have the same repetition rate as the line synchronizing pulses and are impressed on the respective back porches of the line blanking pulses.

When the receiver is tuned to receive a color television signal such as that described above, the signal is intercepted by antenna 11, 12 and amplified by radio frequency amplifier 10. The amplified signal from the radio frequency amplifier is heterodyned to the selected intermediate frequency of the receiver in first detector 13, and the resulting intermediate frequency signal is amplified in intermediate frequency amplifier 14. The amplified intermediate frequency signal is detected in second detector 15 and the resulting composite video signal is amplified in video amplifier 16.

Only the brightness signal component of the composite video signal is selected by the brightness channel, and this component is amplified in video amplifier 17 and supplied with negative-going polarity $(-y)$ to the cathodes of reproducing means 18, 19 and 20.

The chroma sub-carrier components and the reference components of the composite video signal are selected and amplified in bandpass amplifier 21 and supplied to the chroma demodulators 22. The chroma demodulators respond to respective control signals of the proper phase and frequency to develop the $(b-y)$ and $(r-y)$ color difference signals, and these signals are amplified in the direct-current coupled amplifiers 23, 25 and supplied to the control electrodes of the respective reproducing devices 18 and 20. These color difference signals are combined in a suitable matrix to provide the $(g-y)$ color difference signal, and the latter is amplified by direct-current coupled amplifier 24 and supplied to the control electrode of reproducing device 19.

Reproducing device 18 is designated the red cathode ray tube, reproducing device 19 the green cathode ray tube, and reproducing device 20 the blue cathode ray tube. The $(-y)$ signal is supplied to the cathode of the red device 18 and the $(r-y)$ signal to the control electrode of that device so that the resulting modulation of the cathode ray beam is in accordance with red chroma information. Similarly, the resulting modulation of the green cathode ray tube beam is in accordance with the green chroma information, and the modulation of the blue cathode ray beam is in accordance with the blue chroma information.

As more fully described in copending application, Serial No. 324,496, filed December 6, 1952, in the name of the present inventor, and assigned to the present assignee, now Patent No. 2,766,321, granted Oct. 9, 1956, and entitled "Color Demodulator Output Controlled Subcarrier Oscillator," the color demodulators produce a series of pulses whose amplitude and polarity vary in accordance with phase variations between the respective control signals applied to the demodulators and the respective color sub-carrier components. These pulses are selected by gate 30 and used to control oscillator 29 so as to maintain the control signals at the proper phase and frequency so that the chroma demodulators may properly perform their demodulating function.

The sound portion of the receiver forms no part of the present invention and for that reason has not been shown.

Second detector 15 includes a pair of output terminals which are connected across the control electrode and cathode of an electron discharge device 31 included in video amplifier 16 and supply the composite video signal from the detector to device 31 with positive-going polarity. It is to be noted that the second detector is floating with respect to ground, and that the composite video output signal developed across its output terminals appears across the control electrode and cathode of device 31 with no reference to ground potential.

The cathode of device 31 is connected to ground through a pair of series resistors 32 and 33, and the composite video signal from second detector 15 appears across these resistors in amplified form and without phase reversal. The common junction of resistors 32 and 33 is connected to unit 26, and that unit further amplifies the composite video signal and separates the line and field synchronizing components therefrom. The separated line and field synchronizing components are then used to synchronize the operation of sweep systems 27 and 28 in well known manner.

The cathode of discharge device 31 in video amplifier is coupled to the control electrode of a discharge device 36 included in video amplifier 17 through a delay line 34 and a trap circuit 35. Delay line 34 compensates for any delays suffered by the chroma information in the chroma channel of the receiver, and trap circuit 35 discriminates against the chroma sub-carrier components to prevent distortion thereby in the reproduced image. The cathode of discharge device 36 is connected to ground through a pair of series-connected resistors 37 and 38, the junction of these resistors being connected to the positive terminal B+ through a resistor 39. Resistors 38 and 39 form a potentiometer between B+ and ground so that a forced positive bias is impressed on the cathode of device 36. Resistor 38 is adjustable to provide a contrast control for the receiver. The positive bias on the cathode of device 36 enables a direct current connection to be made directly from the second detector 15 through video amplifier 16 to the discharge device 36. This eliminates the necessity for direct current restorers in the brightness channel. The anode of device 36 is connected to the cathodes of the reproducing devices 18, 19 and 20 through a 4.5 megacycle trap circuit 40 which prevents interference on the reproduced image from the intercarrier sound signal.

In this manner, video amplifier 16 develops a composite video signal with positive-going polarity in its cathode circuit, and this signal is applied to the brightness channel of the receiver in amplified form and without phase reversal. Video amplifier 17 in the brightness channel selects the brightness component ($y$) of the composite video signal and amplifies this component and supplies it with negative-going polarity ($-y$) to the cathodes of reproducing devices 18, 19 and 20. Thus only a single amplifier is required in the brightness channel to supply the brightness component with the desired polarity to the reproducing devices.

The color difference signals are demodulated from the sub-carrier components and the chroma information recovered in the chroma channel of the receiver and by means of the circuitry now to be described.

The anode of device 31 in video amplifier 16 is connected to the positive terminal B+ through a 4.5 megacycle sound trap 41 and through a load resistor 42. A variable tap on the load resistor is coupled to the control electrode of an electron discharge device 43 through a capacitor 44, the control electrode being connected to ground through a grid-leak resistor 45. Device 43 constitutes the first stage of the bandpass amplifier 21 which selects only the modulated chroma sub-carrier components of the composite video signal. Network 44, 45 differentiates and discriminates against the low frequency components of the composite video signal. The anode of discharge device 43 is coupled to ground through a 4.5 megacycle series-resonant sound trap 46 which bypasses the inter-carrier sound signal, and the anode is further coupled to the control electrode of an electron discharge device 47 through a capacitor 48. Discharge device 47 constitutes the second stage of the bandpass amplifier and preferably is in the form of a pentode.

The anode of device 43 is connected to the positive terminal B+ through an inductance coil 49, and the control electrode of device 47 is connected to ground through an inductance coil 50 shunted by a resistor 51. Coils 49 and 50 and capacitor 48 form a double tuned coupling circuit, and these elements have suitable parameters to produce a sharp bandpass to the frequency of the modulated chroma sub-carrier components and to discriminate against all other signal components from the video amplifier.

The anode of device 47 is connected to the positive terminal B+ through an inductance coil 52 and is coupled to the anode of a diode 53 in demodulators 22 through a capacitor 54. The demodulators 22 include a red chroma demodulator which, in turn, includes a pair of diodes 53 and 55. The cathode of diode 53 is connected to the anode of diode 55 through a pair of series resistors 56, 57, and through a pair of series capacitors 58, 59. The anode of diode 53 is connected to the cathode of diode 55 through a bifilar inductance winding 60 shunted by a resistor 61. Winding 60, in conjunction with coil 52 and capacitor 54, constitute a double tuned circuit further to assist in the bandpass characteristics of bandpass amplifier 21. In this manner, it is assured that only the modulated sub-carrier components are supplied to the demodulators 21. The modulated sub-carrier components appear across bifilar winding 60 and are 180° out of phase at each end of that winding.

The demodulators 22 also include a blue chroma demodulator which, in turn, includes a diode 62 and a diode 63. The anode of diode 62 is connected to the cathode of diode 63 through a pair of series-connected resistors 64, 65 and through a pair of series-connected capacitors 66, 67. The cathode of diode 62 is coupled to the anode of diode 63 through a pair of series-connected inductance coils 68 and 69. The common junction of coils 68 and 69 is coupled to ground through a capacitor 72. Moreover, the cathode of diode 62 is coupled to the anode of diode 53 through a capacitor 70, and the anode of diode 63 is coupled to the cathode of diode 55 through a capacitor 71.

The operation of the type of chroma demodulators 22 disclosed herein is described in detail in copending application, Serial No. 322,763, now Patent No. 2,718,546, granted September 20, 1955, filed in the name of Kurt Schlesinger, on November 26, 1952, entiled "Phase Detector" and assigned to the present assignee. Briefly, the color sub-carrier components are applied with opposite phase to the respective diodes in each of the demodulators, and a pair of control signals respectively having the frequency and phase of the sub-carrier components is supplied to the demodulators to enable the ($r-y$) and ($b-y$) color difference signals to be recovered. That is, a control signal is applied to the junction of capacitors 58 and 59 which has the frequency and phase of the red chroma sub-carrier component, and a control signal having the frequency and phase of the blue chroma sub-carrier component is applied to the common junction of capacitors 66 and 67. The control signals enable the respective demodulators to develop the ($r-y$) color difference signal at the junction of resistors 56 and 57, and to develop the ($b-y$) color difference signal at the junction of resistors 64 and 65.

Blocking condensers 70 and 71 are utilized between the two chroma demodulators to enable the sub-carriers to be supplied to the demodulators, and yet to permit individual direct-current color-background adjustments for the demodulators. The mid-point of winding 60 is connected to a tap on a potentiometer 73 connected between B+ and ground to establish a selected direct current axis for the red color difference signal corresponding to a selected red background. Likewise, the junction of coils 68 and 69 is connected to an adjustable tap on potentiometer 74 and 75 conected between B+ and ground to provide an adjustable direct current axis for the blue color difference signal so that the blue background may be controlled to any desired value.

The aforementioned control signals for the chroma demodulators are developed by oscillator 29. This oscillator includes an electron discharge device 76 having a crystal 77 in its control grid circuit and whose anode is coupled to the positive terminal B+ through an inductance coil 78. The anode of device 76 is further coupled to the common junction of capacitors 58 and 59 of the red chroma demodulator through a coupling capacitor 79 and supplies a signal to that junction having the frequency and phase of the red chroma sub-carrier component.

Capacitor 79 is coupled to ground through a series-resonant network including a capacitor 80 and inductance coil 81. This network is tuned on the frequency of the signal developed by the oscillator, and the junction of the capacitor and coil is connected to the junction of capacitor 66 and 67 of the blue chroma demodulator. As is well known in series-resonant circuits, the signal developed across inductance coil 82 is in phase quadrature with the signal across the entire series-resonant network. The former signal, therefore, has the proper phase and frequency for application to the blue demodulator for recovering the blue color difference signal from the blue chroma sub-carrier component.

The parameters of crystal oscillator 29 are chosen so that it oscillates at the frequency of the chroma sub-carriers, and the frequency and phase of the oscillator are precisely controlled in the following manner: As previously stated, the color reference bursts in the color television signal have the frequency and phase of the blue sub-carrier component, and when the control signal from oscillator 29 applied to the red demodulator has the exact frequency and phase of the red sub-carrier, these bursts are not demodulated by the red demodulator since they have the blue sub-carrier phase. However, any tendency for the phase of the control signal to vary causes the red demodulator to produce reference pulses having a polarity and amplitude dependent on the direction and amount of such phase shift, and these pulses are applied to gate circuit 30 wherein they are selected and integrated to produce a control potential for reactance tube circuit 83 which varies in such a manner so that the reactance tube opposes any tendency for the control signal from oscillator 92 to shift in phase from the phase of the red sub-carrier. In this manner, the phase and frequency of the control signal applied to the red demodulator is precisely maintained at its desired value and, likewise, the phase and frequency of the control signal applied to the blue demodulator is maintained at its desired value. This arrangement is disclosed and claimed in copending application, Serial No. 324,496, referred to previously herein.

As previously stated, the reference signal bursts are transmitted in the color television signal on the respective back porches of the line blanking pulses and have a selected time lag with respect to corresponding ones of the line synchronizing pulses. It is essential, therefore, that gate circuit 30 be opened a selected time after each line synchronizing pulse so that it can select the pulses from the red demodulator and translate such pulses to the exclusion of the color difference signal produced by the demodulator. The opening of the gate 30 at the proper intervals is achieved in a simplified manner by coupling an inductance coil 93 to the output transformer of line sweep system 28. One end of inductance coil 93 is coupled to the anode of an electron discharge device 84 in gate circuit 30 through a coupling capacitor 85 and the other end of the coil is coupled to ground through a capacitor 86. The coil has a tap 87 thereon which is connected to the anode through a resistor 88.

The anode of discharge device 84 is connected through resistor 88 and through a resistor 89 to a movable tap on a potentiometer 90, 91 and 92 connected between the positive terminal B+ and ground. In this manner, a variable exciting potential is supplied to the anode of the device. The cathode of discharge device 84 is connected to a point on a potentiometer 94 connected between the positive terminal B+ and ground, and the cathode is bypassed to ground by a capacitor 95. In this manner, a positive bias is supplied to the cathode, and the exciting potential to the anode is adjusted so that device 84 is non-conductive to the color difference signal from the red demodulator which is applied to its control electrode along with the aforementioned pulses.

Inductance coil 93 develops negative pulses between one end and tap 87 and develops positive pulses between its other end and tap 87, the pulses corresponding to the line synchronizing pulses. The negative line synchronizing pulses developed by the first mentioned portion of inductance coil 93 are differentiated by the circuit 85, 88 and the differentiated pulses are supplied to the anode of device 84. Capacitor 86 and the remaining portion of coil 93 constitute a pulse balancing circuit, and tap 87 may be adjusted to a null point on coil 93 so that the line synchronizing pulses across the coil do not enter the input circuit to reactance tube 83. This eliminates any spurious effect on the reactance tube by these pulses. The differentiation of the negative line synchronizing pulses by circuit 85, 88 produces a negative-going pulse at the leading edge of each line synchronizing pulse and a positive-going pulse at the trailing edge of each line synchronizing pulse. The positive-going differentiated pulses occur in time coincidence with the reference pulses from the red demodulator and have sufficient amplitude to render device 84 conductive to the reference pulses. The reference pulses translated by discharge device 84 are integrated in network 96 and the resulting control signal is applied to the reactance tube 83.

In the above described manner, gate circuit 30 translates the reference pulses from the red demodulator and these pulses are integrated to form a control signal for reactance tube 83. The amplitude of the control signal varies in correspondence with variations in the amplitude of the reference pulses, and the reactance tube 83 thereby maintains oscillator 29 at the proper frequency and phase to enable the chroma demodulators 22 properly to perform their demodulating function.

As fully described in the aforementioned copending application, Serial No. 322,763, the demodulators 22 produce the red and blue color difference signals on an essentially zero direct current axis. This axis is adjustable slightly above zero in the manner previously described so as to obtain a color background adjustment. Since the modulation components are not disposed on a relatively high direct current axis, it is possible conveniently to provide a direct current path from the demodulators to the image reproducing means. This is an important advantage of the present invention since when alternating current coupling is used, it has been found that direct-current restorers are needed and such restorers respond to the aforementioned reference pulses produced by the demodulators to cause color contamination unless special precautions and extraneous circuitry are used to prevent this.

To achieve the direct current coupling between the red chroma demodulator and the red reproducing device 18, the junction of resistors 56 and 57 is connected through a peaking network 98 to the control electrode of an electron discharge device 99. The control electrode of device 99 is connected to ground through a series resonant circuit 100 which functions as a trap for the 4.5 megacycle intercarrier sound, and the cathode of this device is connected to ground through a resistor 101. The anode of device 99 is connected to the positive terminal B+ through a resistor 102 and the anode is further connected directly to the control electrode of the red reproducing device 18. In this manner, the red color difference signal produced by the red demodulator is amplified in device 99 and supplied to the red reproducing device 18.

Device 99 is normally conductive so that a direct current potential appears across cathode resistor 101, and the cathode of the device is connected to the control electrode of discharge device 84 in gate 30 to supply the aforementioned reference pulses to that device. When the control signal applied to the red chroma demodulator has the proper phase and frequency, a steady direct current potential is applied to the control electrode of device 84 which has no effect on the operation of oscillator 29. However, should the phase of the control signal tend to vary with respect to the red sub-carrier, positive-going or negative-going pulses appear superimposed on the steady direct current potential and are supplied to the discharge device 84 of gate 30 with an amplitude and polarity depending on the amount and direction of the phase shift tendency.

The blue color difference signal appearing at the junction of resistors 64 and 65 is supplied on an essentially zero direct current axis to the control electrode of an electron discharge device 103 in the amplifier 25 through a peaking network 104. The control electrode of device 103 is connected to ground through a series resonant trap 106 for the intercarrier sound signal and the cathode of this device is connected to ground through a resistor 107 and series-connected variable resistor 108. The anode of device 103 is connected to the positive terminal B+ through a load resistor 109 and is directly connected to the control electrode of the blue cathode ray image reproducing tube 20.

The direct current coupled amplifiers 23 and 25 are made degenerative by the respective cathode resistors 101, and 107, 108 to minimize tube drift and increase color stability. For proper operation of these degenerative direct current coupled amplifiers, it is essential that a high level signal is translated thereby. For this reason, the chroma sub-carrier components from video amplifier 16 are amplified to a high level by the two-stage bandpass amplifier 21 prior to their application to the chroma demodulators. This enables the demodulators to develop high amplitude color difference signals, and these signals are again amplified by the direct current coupled amplifiers 23 and 25, the latter amplifiers being efficiently operated at a high level and degenerative for high color stability.

As previously stated, the green color difference signal is obtained by a suitable matrix which comprises a pair of series resistors 109 and 110 connected between the anodes of devices 99 and 103. The common junction of resistors 109 and 110 is connected to the control electrode of an electron discharge device 111 included in direct current coupled amplifier 24. The cathode of device 111 is connected to a point on a potentiometer 112, 113 connected between the positive terminal B+ and ground, and the control electrode of that device is connected to a movable tap on the potentiometer through a resistor 114 to constitute a green chroma background adjustment. The anode of 111 is directly connected to the positive terminal B+ through a load resistor 113 and is directly connected to the control electrode of the green reproducing device 19.

Th green color difference signal produced across resistors 109, 110 is amplified by device 111 and applied to the control electrode of the green cathode ray reproducing tube 19. Device 111 is also degenerative for color stability, and a high amplitude level green color difference signal is applied to its control electrode for efficient operation of the device.

The invention provides, therefore, an improved and simplified color television receiver in which the chroma sub-carriers are selected and highly amplified by a two-stage bandpass amplifier and applied to the chroma demodulators which in turn produce high amplitude demodulated $(r-y)$ and $(b-y)$ color difference signals on an essentially zero direct current axis. These color difference signals are respectively amplified in direct current coupled amplifiers 23 and 25 which provide a direct current path for the signals to the respective cathode ray reproducing devices 16 and 20.

The green color difference signal is obtained by a matrix which is coupled for direct current to the red and blue direct current coupled amplifiers, and the green color difference signal is amplified in a direct current coupled amplifier and applied to the green cathode ray tube. Due to the fact that the color sub-carriers are highly amplified in the bandpass amplifier prior to their demodulation, the color demodulators develop the color difference signals with sufficient intensity that all the direct current coupled amplifiers 23, 24 and 25 may be efficiently operated degeneratively for high stability.

Convenient color background brightness controls are provided for the blue and green colors so that a desired color brightness balance may be easily achieved. The color brightness control for the blue color is incorporated in the blue chroma demodulator so that a simple adjustment may be made prior to final amplification of the blue color. Likewise the green chroma adjustment is made in the grid circuit of the green direct circuit amplifier 25 for a convenient relatively low level adjustment of the color difference signal.

It is to be noted that by using standard vacuum tubes which include pairs of discharge devices within a single envelope, the entire decoding section of the television receiver of this invention may be comprised of merely seven separate tubes as compared with the usual forty or more prevalent in the equivalent section of present-day receivers of this type.

A commercial embodiment of the present invention has been constructed and has been found to operate with a high degree of efficiency and even to surpass in performance the more complicated and expensive receivers.

While a particular embodiment of the invention has been shown and described, modifications may be made and it is intended in the appended claims to cover all such modifications as fall within the true spirit and scope of the invention.

I claim:

1. A color television receiver for utilizing a color television signal which includes at least one sub-carrier component modulated in accordance with chroma information, said receiver including in combination, a detector for demodulating the color television signal, cathode ray image reproducing means, a first amplifier circuit coupled to said detector and including a differentiating network for discriminating against low frequency signal components from said detector, a second amplifier circuit, a first tuned network coupling said first amplifier circuit to said second amplifier circuit, a chroma demodulator for deriving the chroma modulation components of the sub-carrier component, a second tuned network coupling said second amplifier circuit to said chroma demodulator, said differentiating network and said first and second tuned networks having selected parameters to cause said first and second amplifier circuits to select and amplify the modulated sub-carrier component of the color television signal and translate such sub-carrier component to said chroma demodulator, and a degenerative amplifier direct current coupled to said chroma demodulator and to said cathode ray image reproducing means for amplifying said chroma modulation components and providing a direct current path therefor from said chroma demodulator to said reproducing means.

2. A color television receiver for utilizing a color television signal which includes at least one sub-carrier component modulated in accordance with chroma information, said receiver including in combination, a detector for demodulating the color television signal, cathode ray image reproducing means, bandpass amplifier means coupled to said detector for selecting and amplifying the modulated sub-carrier component of the color television signal, a chroma demodulator coupled to said bandpass amplifier for deriving the chroma modulation components of the sub-carrier component, an adjustable color background bias network included in said chroma demodulator for controlling the direct current axis of the chroma modulation components from said chroma demodulator, and a direct current coupled amplifier coupled to said chroma demodulator and to said cathode ray image reproducing means for amplifying said chroma modulation components and providing a direct current path therefor from said chroma demodulator to said reproducing means.

3. A color television receiver for utilizing a color television signal which includes a brightness signal component and at least one sub-carrier component modulated in accordance with chroma information, said receiver including in combination, a detector for demodulating the color television signal, an electron discharge amplifier having an anode, a cathode and a control electrode, means for coupling said detector across said control electrode and cathode, an impedance element connecting said cathode to a point of reference potential, cathode ray image reproducing means, a second amplifier coupled to said cathode for supplying the brightness signal component of the color television signal to said reproducing means, said first mentioned amplifier amplifying the brightness signal and applying the brightness signal to said second amplifier without phase reversal, a bandpass amplifier coupled to said anode for selecting and amplifying the modulated sub-carrier component of the color television signal, a chroma demodulator coupled to said bandpass amplifier for deriving the chroma modulation components of the sub-carrier component, and amplifier means for the chroma modulation components providing a direct current path from said chroma demodulator to said cathode ray image reproducing means.

4. A color television receiver for utilizing a color television signal which includes a brightness signal component and at least one sub-carrier component modulated in accordance with chroma information, said receiver including in combination, a detector for demodulating the color television signal, an electron discharge amplifier having an anode, a cathode and a control electrode, means for coupling said detector across said control electrode and cathode, an impedance element connecting said cathode to a point of reference potential, cathode ray image reproducing means, a second amplifier coupled to said cathode for supplying the brightness signal component of the color television signal to said reproducing means, said first mentioned amplifier amplifying the brightness signal and applying the brightness signal to said second amplifier without phase reversal, a bandpass circuit coupled to said anode for selecting the modulated sub-carrier component of the color television signal, a chroma demodulator coupled to said bandpass circuit for deriving the chroma modulation components of the sub-carrier, and means for applying the chroma modulation components from said chroma demodulator to said image reproducing means.

5. A color television receiver for utilizing a color television signal which includes at least one sub-carrier component modulated in accordance with chroma information, and bursts of a reference signal component of the same frequency as the sub-carrier component and having a selected phase relation therewith, said receiver including in combination, a detector for demodulating the color television signal, cathode ray image reproducing means, bandpass amplifier means coupled to said detector for selecting and amplifying the modulated sub-carrier component and the reference signal bursts of the color television signal, a chroma demodulator coupled to said bandpass amplifier and responsive to a control signal for deriving the chroma modulation components of the sub-carrier, said chroma demodulator also producing a series of reference pulses in response to the reference signal bursts varying in accordance with the amount and direction of a phase variation between the control signal and sub-carrier, a direct current coupled amplifier coupled to said chroma demodulator and to said cathode ray image reproducing means for amplifying said chroma modulation components and providing a direct current path therefor from said chroma demodulator to said reproducing means, said direct current coupled amplifier also translating said reference pulses, and means responsive to the reference pulses from said direct current coupled amplifier for producing a control signal maintained at the frequency and phase of the sub-carrier and for supplying such control signal to said chroma demodulator.

6. A color television receiver for utilizing a color television signal which includes synchronizing pulses recurring at a preselected repetition rate, at least one sub-carrier component modulated in accordance with chroma information, and bursts of a reference signal component of the same frequency as the sub-carrier component and having a selected phase relation therewith, said reference signal bursts recurring at the same repetition rate as the synchronizing pulses and each of said bursts lagging a corresponding one of the synchronizing pulses by a predetermined amount, said receiver including in combination, a detector for demodulating the color television signal, cathode ray image reproducing means, bandpass amplifier means coupled to said detector for selecting and amplifying the modulated sub-carrier component and the reference signal bursts of the color television signal, a chroma demodulator coupled to said bandpass amplifier and responsive to a control signal for deriving the chroma modulation components of the sub-carrier, said chroma demodulator also producing a series of reference pulses in response to the reference signal bursts varying in accordance with the amount and direction of a phase variation between the control signal and sub-carrier, an amplifier including an electron device having a cathode, a grid, and an anode, with said grid being coupled to said chroma demodulator and said anode being coupled to said cathode ray image reproducing means, said amplifier amplifying said reference pulses and said chroma modulation components and providing a direct current path for said chroma modulation components from said chroma demodulator to said reproducing means, a sweep system for said reproducing means, means for supplying the synchronizing components to said sweep system, means including a gate circuit coupled to said cathode of said electron device for selecting the reference pulses and for utilizing such pulses to produce a control signal maintained at the frequency and phase of the sub-carrier, means including a differentiating network coupled to said sweep system for actuating said gate circuit at the proper times to cause said gate to select the reference pulses from said chroma demodulator, and means for supplying the last mentioned control signal to said chroma demodulator.

7. A color television receiver for utilizing a color television signal which includes synchronizing pulses recurring at a selected repetition rate, at least one sub-carrier component modulated in accordance with chroma information, and bursts of a reference signal component of the same frequency as the subcarrier component and having a selected phase relation therewith, said reference bursts recurring at the same repetition rate as the synchronizing pulses and each of said bursts lagging a corresponding one of the synchronizing pulses by a predetermined amount, said receiver including in combination, a detector for demodulating the color television signal, cathode ray image reproducing means, bandpass amplifier means coupled to said detector for selecting and amplifying the modulated sub-carrier component and reference signal bursts of the color television signal, a chroma demodulator coupled to said bandpass amplifier and responsive to a control signal for deriving the chroma modulation components of the sub-carrier, said chroma demodulator also producing a series of reference pulses in response to the reference signal bursts varying in accordance with the amount and direction of a phase variation between the control signal and sub-carrier, means for supplying the chroma modulation components from said chroma demodulator to said image reproducing means, a sweep system for said image reproducing means, means including a gate circuit for selecting the reference pulses from said chroma demodulator and for utilizing such pulses to produce a control signal maintained at the frequency and phase of the sub-carrier, an inductance coil coupled to said sweep system for deriving the aforesaid synchronizing pulses therefrom, a first capacitor coupling one end of said inductance coil to a point of reference potential, a differentiating network including a second capacitor and a resistor series-connected between the other end of said inductance coil and a tap on said coil representing a null point established by said first capacitor, said differentiating network supplying pulses to said gate circuit to cause said gate circuit to select the reference pulses from said chroma demodulator, and means for supplying said last mentioned control signal to said chroma demodulator.

8. A color television receiver for utilizing a color television signal which includes a brightness signal component and at least one sub-carrier component which is modulated in accordance with chroma information, said receiver including in combination, a detector for demodulating the color television signal; an electron discharge amplifier having an anode, a cathode and a control electrode; circuit means connecting said detector across said control electrode and cathode of said electron discharge amplifier, said circuit means including direct-current impedance means connecting said cathode to a point of reference potential; cathode ray image reproducing means; a second amplifier for amplifying the demodulated television signal appearing across said impedance means to supply the brightness signal component of the color television signal to said reproducing means, said amplifier discharge device amplifying the brightness component and supplying the same to said second amplifier without phase reversal; a band pass circuit coupled to said anode for selecting the modulated sub-carrier component of the color television signal; a chroma demodulator coupled to said bandpass circuit for deriving the chroma modulation components of the sub-carrier; and means for applying the chroma modulation components from said chroma demodulator to said image reproducing means.

9. In a color television receiver for utilizing a television signal modulated with brightness and chroma information, the combination including a cathode ray tube adapted to produce color images, a detector for demodulating the television signal to produce brightness signals and chroma signals, an amplifier for said signals including an electron discharge device having a cathode and an anode and a control grid, potential supply means having a positive portion coupled to said anode and further having a negative portion, direct current coupling means connecting said detector between said control grid and said cathode, direct current impedance means connected to said coupling means and to said negative portion of said potential supply means to provide a load impedance for said cathode, a video amplifier stage direct current connected to said cathode ray tube, further direct current coupling means including a delay line connecting said video amplifier stage to said direct current impedance means, so that said brightness signals are direct current coupled from said detector to said cathode ray tube, and circuit means connected to said electron discharge device for applying said chroma signals to said cathode ray tube.

10. A television receiver for utilizing a television signal which has synchronizing components and picture components, said receiver including in combination, a detector for demodulating the television signal, an amplifier including an electron discharge device having an anode, a cathode and a control electrode, first direct current impedance means connecting said cathode to a point of reference potential, first circuit means coupling said detector between said control electrode and said first impedance means at a point thereon remote from said point of reference potential, so that said detector is floating with respect to said point of reference potential for direct current, second circuit means connected to said anode of said discharge device and including second impedance means, a first channel coupled to said first impedance means for utilizing the synchronizing components of the demodulated television signal appearing across said first impedance means, and a second channel connected to said second impedance means for utilizing the picture components of the demodulated television signal appearing across said second impedance means.

References Cited in the file of this patent

UNITED STATES PATENTS

| | | |
|---|---|---|
| 1,909,239 | Travis | May 16, 1933 |
| 2,153,756 | Hunt | Apr. 11, 1939 |
| 2,232,856 | Idle | Feb. 25, 1941 |

FOREIGN PATENTS

| | | |
|---|---|---|
| 497,371 | Great Britain | Dec. 19, 1938 |
| 724,941 | Great Britain | Feb. 23, 1955 |

OTHER REFERENCES

Principles of NTSC Compatible Color Television, Electronics, February 1952, pages 89–95.

Compatible Color TV Receiver, Electronics, January 1955, pages 98–104.